US012156582B2

(12) United States Patent
Rocchisani et al.

(10) Patent No.: US 12,156,582 B2
(45) Date of Patent: Dec. 3, 2024

(54) SYSTEM AND METHOD FOR DISPENSING A COLOURED PRODUCT

(71) Applicant: MAISON M, Chartres (FR)

(72) Inventors: Marie Rocchisani, Lagny-sur-marne (FR); Christophe Bisson, Chennevières-sur-Marne (FR)

(73) Assignee: MAISON M, Chartres (FR)

( * ) Notice: Subject to any disclaimer, the term of this patent is extended or adjusted under 35 U.S.C. 154(b) by 0 days.

(21) Appl. No.: 17/768,714

(22) PCT Filed: Oct. 16, 2020

(86) PCT No.: PCT/FR2020/051862
§ 371 (c)(1),
(2) Date: Apr. 13, 2022

(87) PCT Pub. No.: WO2021/074550
PCT Pub. Date: Apr. 22, 2021

(65) Prior Publication Data

US 2024/0130509 A1 Apr. 25, 2024
US 2024/0225240 A9 Jul. 11, 2024

(30) Foreign Application Priority Data

Oct. 18, 2019 (FR) ....................................... 1911681

(51) Int. Cl.
*A45D 44/00* (2006.01)
*B01F 27/118* (2022.01)
(Continued)

(52) U.S. Cl.
CPC .......... *A45D 44/005* (2013.01); *B01F 27/118* (2022.01); *B01F 33/50112* (2022.01);
(Continued)

(58) Field of Classification Search
CPC ............ A45D 44/005; A45D 2044/007; B01F 33/841; B01F 35/7174; B01F 33/50112;
(Continued)

(56) References Cited

U.S. PATENT DOCUMENTS 9,999,288 B2 * 6/2018 Samain .................. B01F 33/84
10,602,830 B2 * 3/2020 Giron ................ G09B 19/0023
(Continued)

FOREIGN PATENT DOCUMENTS

CN 107080349 A 8/2017
DE 202011100742 U1 8/2012
(Continued)

OTHER PUBLICATIONS

International Search Report mailed Feb. 11, 2021, in corresponding to International Application No. PCT/FR2020/051862; 7 pages (with English Translation).

*Primary Examiner* — Paul R Durand
*Assistant Examiner* — Michael J. Melaragno
(74) *Attorney, Agent, or Firm* — Maier & Maier, PLLC

(57) ABSTRACT

A delivery system of a colored product having a target color including an application device of the colored product, at least two reservoirs each containing a respective base product, a calculation module configured to receive the information concerning the target color and to determine a composition of the colored product from the base products contained in the reservoirs, at least one metering device in fluid communication with the reservoirs, configured to deposit on the application device a dose of each of the base products corresponding to the determined composition, a mixing device configured to mix the doses of base products deposited on the application device. Also, a method for delivering a colored product having a target color via the delivery system. Finally, the use of the system for applica-
(Continued)

tions requiring the delivery of a colored product having a target color.

30 Claims, 7 Drawing Sheets

(51) Int. Cl.

| | |
|---|---|
| ***B01F 33/501*** | (2022.01) |
| ***B01F 33/84*** | (2022.01) |
| ***B01F 33/841*** | (2022.01) |
| ***B01F 35/21*** | (2022.01) |
| ***B01F 35/71*** | (2022.01) |
| ***B01F 35/88*** | (2022.01) |
| ***B01F 101/21*** | (2022.01) |

(52) U.S. Cl.
CPC ........ *B01F 33/841* (2022.01); *B01F 33/8442* (2022.01); *B01F 35/2131* (2022.01); *B01F 35/7174* (2022.01); *B01F 35/8822* (2022.01); *A45D 2044/007* (2013.01); *B01F 2101/21* (2022.01)

(58) Field of Classification Search
CPC .......................... B01F 33/8442; B01F 27/118; B01F 35/2131; B01F 35/8822; B01F 2101/21
See application file for complete search history.

(56) References Cited

U.S. PATENT DOCUMENTS

| | | | | |
|---|---|---|---|---|
| 2008/0302380 | A1 | 12/2008 | Morales | |
| 2011/0247718 | A1* | 10/2011 | Samain | B01F 35/2205 141/94 |
| 2016/0143408 | A1 | 5/2016 | Grez | |
| 2017/0228892 | A1 | 8/2017 | Nichol et al. | |
| 2017/0340087 | A1* | 11/2017 | Samain | A45D 40/26 |
| 2017/0360178 | A1* | 12/2017 | Samain | B01F 25/45243 |
| 2017/0367462 | A1* | 12/2017 | Samain | B01F 25/45243 |
| 2018/0042361 | A1* | 2/2018 | Giron | B05B 12/1409 |

FOREIGN PATENT DOCUMENTS

| | | | | |
|---|---|---|---|---|
| EP | 3207821 | A1 | 8/2017 | |
| FR | 3029088 | A1 | 6/2016 | |
| WO | 2014043018 | A1 | 3/2014 | |
| WO | WO-2016087468 | A1 * | 6/2016 | A45D 33/00 |
| WO | 2018164905 | A1 | 9/2018 | |
| WO | 2018179869 | A1 | 10/2018 | |

* cited by examiner

SYSTEM AND METHOD FOR DISPENSING A COLOURED PRODUCT

FIELD

The present invention relates to a delivery system, mobile, miniaturized and automated, making it possible to recover, process, reproduce and distribute a colored product having a target color, selected custom-made by a user. The system is refillable in raw material and reusable at will. The system also allows a high precision dosage and therefore the delivery of a necessary quantity of colored product for application by a user, on himself or on another support.

The present invention also relates to a method for delivering a colored product having a target color using a delivery system according to the present invention.

The delivery system of the present invention can be used in applications requiring the distribution of a colored product having a target color.

BACKGROUND

In the research and purchase of their cosmetic products, consumers are today more and more demanding and are sensitive to different criteria as to the choice of their new product, which must, for example, be respectful of the environment and of the skin of its user.

For this reason, players in the cosmetics sector must now offer a range of products that meet these criteria while offering a wide choice to consumer, allowing him to find the tints that match his skin or his desires.

Despite some progress performed in this area, overall, players in the cosmetics sector are still struggling to take this turn. The cosmetics sector is for example the second most polluting in France, mainly due to:

- Unsuitable products with plastic box (primary source of pollution) and non-optimized containers (30% of the material is lost).
- An overconsumption with significant environmental consequences (one billion lipsticks purchased and therefore thrown away per year, for example).

We also note that cosmetic products often target a certain type of skin, in particular Caucasian, abandoning skin with high or low melanin amounts.

Therefore, there is a need to offer a product offering its user a unique and personalized experience, without distinction, while being ecologically responsible, that is to say respectful of the skin of its user and the environment, and by limiting the overconsumption and therefore the waste and the loss of material.

It is known, for example, lipsticks whose box is unique and can be refilled with sticks sold in the form of refills; this is particularly the case for Rouge G® lipsticks by Guerlain®, or else the lipstick by La Bouche Rouge®. However, the purchase of refills of different colors remains necessary with this type of system, in the event that its user wishes to change color.

It is also known dispensers which make it possible to deliver a cosmetic composition of variable color. Application FR3029088 relates for example to a delivery system, in particular for a make-up product, making it possible to personalize the product used by a consumer. The latter supplies a delivery system consisting of a case and at least two compartments received in the case, each compartment being provided with a movable piston and a delivery nozzle through which the base product exits. The mixture is generated from the different base products, these base products possibly having different colors, so that the color, the tint or even the coverage of the mixture can be personalized, the mixture being collected in a cup including a static mixer.

Patent application WO2014043018 discloses a custom-made coloring system, in particular of a cosmetic product having a color matching the skin color of its user. The process including a skin color analysis step using a spectrophotometer and a camera, sends mixing and dosing instructions to a remote formulation machine which makes the mixture from a series of base products and delivers it to a container.

However, several disadvantages result from these systems. First of all, they offer a mixture recovery device forcing the user to use their finger or another means of external application. In addition, the metering system does not always allow the delivery of a single dose so that, if the quantity delivered is excessive, there is a loss of product and conversely, if the quantity delivered is not sufficient, the process must be repeated, resulting again in a loss of product. The user still has to go to points of sale in order to make his custom-made mixture, or else wait for the delivery of his product.

The purpose of the present invention is to meet this need by proposing a mobile, miniaturized and automated delivery system, making it possible to recover, process, reproduce and deliver a colored product having a target color, selected custom-made by a user, the delivery system is refillable in raw material and reusable at will, thus reducing waste, the system of the invention also allows a dosage of great precision and therefore the delivery of a necessary quantity for one application without loss of product.

SUMMARY

The invention therefore relates to a system for delivering a colored product having a target color.

According to one aspect, the invention relates to a system for delivering a colored product having a target color, comprising: an application device for a colored product; at least two reservoirs each containing a respective base product; a calculation module configured to receive the information concerning the target color and to determine a composition of the colored product from the base products contained in the reservoirs; at least one metering device in fluid communication with the reservoirs, configured to deposit on the application device a dose of each of the base products corresponding to said determined composition; a mixing device configured to mix the doses of the base products deposited on the application device.

The present invention advantageously makes it possible to recover, process, reproduce and distribute a colored product having a target color.

In particular embodiments, the delivery system may further include one or more of the following characteristics, taken individually or according to all possible technical combinations.

In one embodiment, the delivery system further comprises a color sensor able to scan and decompose the target color and to send the information of the target color to the calculation module. Such a configuration of said delivery system makes it possible to recover and process a target color. The data emitted by the color sensor concerning the target color are sent to the calculation module which in turn sends the orders to the control means of the metering devices, as to the necessary quantities of each base product in order to reproduce the colored product having the target color. It is therefore a particularly advantageous configuration since it allows a user to choose and reproduce a custom-made target color.

In an alternative embodiment, the delivery system further comprises a computer program able to communicate the target color to the calculation module. Such a configuration of the delivery system is advantageous because it allows a user to choose a target color directly via the computer program, the computer program being able to be a portable terminal such as a smartphone, a tablet or a personal computer. Such a configuration also allows a user to enter data about him, such as the skin tone, the physical characteristics, the personality, the habits or the coordination with other make-ups, directly via the computer program.

In one embodiment, said application device comprises: an applicator able to receive a dose of each of the base products; a motor able to move the applicator in order to position it successively opposite the or each metering device and opposite the mixing device.

In one embodiment, said application device comprises a hood forming a cap of the delivery system, the hood comprising a hanging device on a case housing the or each metering device and the mixing device, the hanging device being configured to ensure a predefined positioning of the applicator relative to the metering and mixing devices.

According to these configurations, the colored product is delivered directly on said applicator. Thus, these embodiments advantageously allow a user to apply the colored product delivered, on himself or another support.

In one embodiment, said metering and mixing devices are distributed around the applicator, the motor being able to move the applicator in rotation according to a defined angular displacement in order to position it successively opposite the or each metering and opposite the mixing device.

In one embodiment, the delivery system further comprises an additional reservoir containing a cleaning product. Such a configuration of the delivery system is advantageous because it makes it possible to eliminate the residues of the delivered mixture remaining on the applicator, the cleaning fluid being applied by metering on the applicator.

In one embodiment, the delivery system comprises, for each reservoir containing a base product, a respective metering device in fluid communication with said reservoir, which is configured to deposit on the application device a dose of the base product contained in said reservoir. Such a configuration of the delivery system is advantageous because it makes it possible to vary the volume delivered coming from each reservoir and thus to refine the dosage of base products according to the needs.

In one embodiment, the or each metering device comprises: a pre-metering chamber configured to be in fluid communication in a selective manner with one of the base product reservoirs; a metering member able to extract from the pre-metering chamber a predetermined quantity of base product and movable between the pre-metering chamber and the application device; a means of displacement of the metering member, able to give the metering member a back-and-forth movement between the pre-metering chamber and the application device in order to deposit on the application device a dose of the base product corresponding to said determined composition.

In one embodiment, the reservoirs, the or each metering device and the mixing device are housed in a same case.

In one embodiment, with each back and forth movement, the metering member is able to deposit on the application device a predetermined quantity of base product between 0.07 μl and 150 ml.

In one embodiment, each base product is a pigmented cosmetic formulation.

In one embodiment, the reservoirs are removable cartridges. Such a configuration is advantageous because it allows a user to remove the cartridges when they are empty. Such a configuration also makes it possible to change or refill the cartridges in base product.

In one embodiment, the mixing device comprises a motorized rotating brush able to put itself on the application device. Such a configuration allows the mixing device to homogenize the mixture of the doses of base products deposited on the application device.

In one embodiment, the delivery system includes an energy supply device. According to such a configuration, the hanging device ensures an electrical contact between the energy supply device and the displacement motor of the applicator.

In one embodiment, the delivery system comprises means for locking the motor in a configuration separated from the hood relative to the case. Such a configuration is advantageous because it makes it possible to block the displacement of the applicator and thus facilitate application by a user.

According to another aspect, the invention relates to a custom-made delivery method of a colored product having a target color using the delivery system of the present invention, comprising the following steps:

- scanning and decomposing the target color using the color sensor;
- receiving the information regarding the target color using the calculation device;
- determining a composition of the colored product from the base products contained in the reservoirs;
- depositing on the application device, using the or each metering device, a dose of each of the base products corresponding to said determined composition;
- mixing the doses of base products deposited on the application device using the mixing device.

In one embodiment, the application device is unlocked after mixing the doses of base products. Such a configuration allows a user to apply the colored product, on himself or on another support.

In one embodiment, the application device is positioned in its original position after application of the colored product by a user.

In one embodiment, a cleaning product is applied on the applicator. Such a configuration is advantageous because it makes it possible to eliminate the residues of colored products remaining on the applicator.

According to these configurations, the preceding steps can be repeated in order to reproduce a colored product having the same color or a different color.

In another aspect, the present invention relates to the use of the delivery system of the present invention for applications requiring the delivery of a colored product having a target color.

In one embodiment, the delivery system of the present invention is used for cosmetic applications requiring the delivery of a colored product having a target color.

In one embodiment, the delivery system of the present invention is used for various applications requiring the delivery of a colored product having a target color.

Definitions

In the present invention, the terms hereinafter are defined as follows:

«Bluetooth» relates to a wireless communication protocol, aiming to connect mobile devices to each other. The Bluetooth has a short range compared to WiFi.

«Primary color» relates to, in a color synthesis system, a color which cannot be reproduced by a mixture of other colors. Colors are said to be primary between each other if none can be reproduced by mixing the others.

«Dose» relates to a precise quantity of one of the base products, expressed in IA «Renewable material» relates to a natural resource whose stock can be replenished over a short period on a human scale of time, by renewing itself at least as quickly as it is consumed.

«Pigment» relates to a mineral or organic coloring substance insoluble in the medium it colors.

«Colored product» relates to a coloring substance or material used in cosmetics, dyeing, painting, etc.

«QR code» is the acronym for "Quick Response Code" or 2D bar code. The QR code is readable by smart phones and tablets and it allows more information to be stored than a horizontal bar code.

«Additive synthesis» relates to the process consisting in combining the lights of several colored sources in order to obtain any colored light in a given gamut. Additive synthesis generally uses three colored lights: one red, one green and one blue.

«Subtractive synthesis» relates to the process consisting in combining the absorption of at least three dyes to obtain all the shades of a range. The term subtractive comes from the fact that a colored object absorbs part of the incident light. It therefore subtracts part of the light spectrum from it.

«WiFi» relates to a set of wireless communication protocols governed by the standards of the IEEE 802.11 group (ISO/IEC 8802-11). A WiFi network makes it possible to connect by radio waves several computer devices (computer, router, smartphone, Internet modem, etc.) within a computer network in order to allow the transmission of data between them.

DETAILED DESCRIPTION

The following description will be better understood from reading the drawings. For the purpose of illustrating the invention, the device is shown in preferred embodiments. It should be understood, however, that the present application is not limited to the precise arrangements, structures, characteristics, embodiments and appearances indicated. The drawings are not drawn to scale and are not intended to limit the scope of the claims to the embodiments shown in these drawings. Therefore, it should be understood that when features mentioned in the claims are followed by references, said references are included only for the purpose of improving the understanding of the claims and in no way limit the scope of these claims.

The embodiments presented in the rest of the description apply mutatis mutandis to the entire description and in particular to the whole of the embodiments described in the figures of the application.

The System

The present invention relates to a delivery system (1) of a colored product having a target color, characterized in that it comprises:

an application device (5) of the colored product;

at least two reservoirs ($3_1$, $3_2$, . . . ) each containing a respective base product;

a calculation module (18) configured to receive the information concerning said target color and to determine a composition of the colored product from the base products contained in the reservoirs ($3_1$, $3_2$, . . . );

at least one metering device (4) in fluid communication with the reservoirs ($3_1$, $3_2$, . . . ), configured to deposit on the application device (5) a dose of each of the base products corresponding to said determined composition;

a mixing device (4') configured to mix the doses of the base products deposited on the application device (5).

Figure 1:
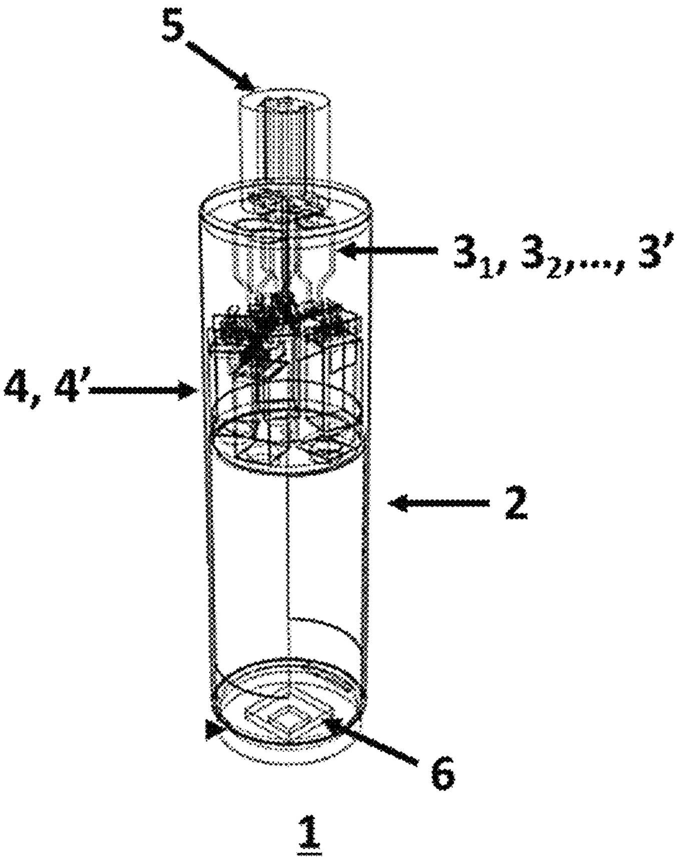
FIG. 1 is a schematic perspective view with removal of some components of the delivery system of the present invention.
Figure 2:
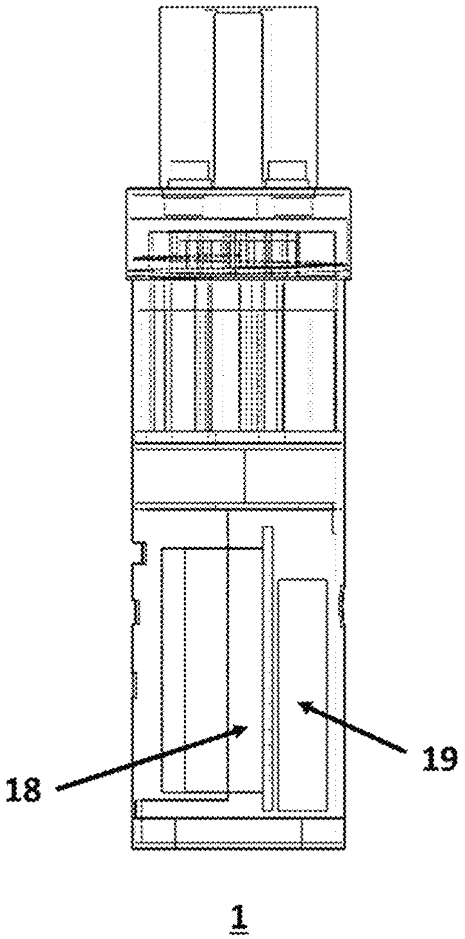
FIG. 2 is a schematic view with removal of some components of the delivery system of the present invention.

FIGS. 1 and 2 show an embodiment according to the invention in which the delivery system (1) comprises a case (2) comprising an energy supply device (19) located in the lower part of said case (2) (as shown in FIG. 2). The case (2) has an elongated shape along a longitudinal axis. As seen in FIG. 1, the delivery system (1) also includes at least two reservoirs ($3_1$, $3_2$, . . . ) received in the case (2). The delivery system (1) further comprises an additional reservoir (3'). At least two metering devices (4) in fluid communication with the reservoirs ($3_1$, $3_2$, . . . , 3') are present as well as a mixing device (4'). As shown in FIG. 1, the delivery system (1) is provided on its upper part with an application device (5) forming a cap of the delivery system (1). The application device (5) is provided with an applicator (12) of elongated shape along a longitudinal axis and directed towards the inside of the case (2). The reservoirs ($3_1$, $3_2$, . . . , 3'), the metering devices (4) and the mixing device (4') are arranged so as to form a circle around the applicator (12). The delivery system (1) is provided on its lower part with a color sensor (6) able to scan the target color and to send the information of the target color to the calculation module (18) located in the lower part of the case (2), as shown in FIG. 2.

According to one embodiment, the delivery system (1) consists of a single device operating independently. In one embodiment, the delivery system (1) can be handled with one hand.

According to another embodiment, the delivery system (1) is controllable using a device that operates by interacting with the delivery system (1). In one embodiment, it may be a computer program which exchanges information with the delivery system (1) to control it. In one embodiment, the delivery system (1) is controlled by a computer program which is integrated into the delivery system (1). In one embodiment, the delivery system (1) is controlled by a computer program which is external to the delivery system (1). In one embodiment, the delivery system (1) is configured to exchange information with the computer program. In one embodiment, the delivery system (1) is configured to exchange information with the computer program by a wireless protocol. In one embodiment, the computer program is a portable terminal such as a smart phone, tablet, or personal computer. In one embodiment, the delivery system (1) is equipped with a Bluetooth chip. In one embodiment, the delivery system (1) is equipped with a WiFi connection system.

According to one embodiment, the delivery system (1) is able to process, reproduce and deliver a mixture from base products. In one embodiment, the dispensed mixture is a personalized cosmetic formulation. In one embodiment, the dispensed mixture is a colored product having a custom-made selected target color. In one embodiment, a colored product consisting of at least two base products is delivered in adjustable proportions. In one embodiment, a colored product consisting of at least three base products is delivered in adjustable proportions. In one embodiment, a colored product consisting of at least four base products is delivered in adjustable proportions. In one embodiment, a colored product consisting of at least five base products is delivered in adjustable proportions. In a preferred embodiment, the colored product dispensed is a custom-made selected pigmented cosmetic formulation.

In one embodiment, the delivery system is able to process, reproduce and deliver an eyeshadow tint. In one embodiment, the delivery system is able to process, reproduce and deliver a blush tint. In one embodiment, the delivery system is able to process, reproduce and deliver a nail polish tint. In one embodiment, the delivery system is able to process, reproduce and deliver a foundation tint. In a preferred embodiment, the delivery system is able to process, reproduce and deliver a lipstick tint.

Reservoirs

Figure 3:
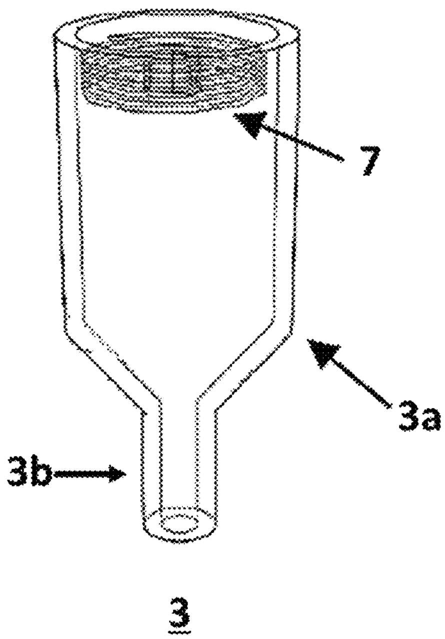
FIG. 3 represents in isolation and partially one of the reservoirs.

FIG. 3 shows in isolation one of the reservoirs (3) comprising a body (3*a*) and a smooth head (3*b*). In order to give the liquid a sufficient flow rate, the upper part of the reservoir is moved by a spring (7) exerting a pressure on the liquid along a longitudinal axis.

According to another embodiment, the reservoirs ($\mathbf{3}_1$, $\mathbf{3}_2$, . . . ) are fixed. According to a preferred embodiment, the reservoirs ($\mathbf{3}_1$, $\mathbf{3}_2$, . . . ) are removable cartridges. In one embodiment, the cartridges can be removed when they are empty.

In one embodiment, the cartridges are refillable with a base product (11). In one embodiment, the cartridges are capped containers able to be pierced during their insertion into the case (2). In one embodiment, the volume of the cartridges is between 0.5 ml and 1000 ml.

According to another embodiment, the cartridges are provided with a removable closure device, such as a cap which can be unscrewed allowing them to be opened and closed. In this embodiment, the cartridges have a thread on their head (3*b*) and are able to be screwed inside the case (2).

In another embodiment, the cartridges have a lug on their head (3*b*). In this embodiment, the cartridges are able to be clipped inside the case (2).

According to one embodiment, the cartridges are introduced through the upper part of said case (2) by a simple pressure on the upper part of said case (2), unlocking the cartridge access airlock. In one embodiment, the cartridges are introduced through the upper part of said case (2) by unscrewing it.

In another embodiment, the cartridges are introduced through the lower part of said case (2) by simply pressing on the lower part of said case (2), unlocking the cartridge access airlock. In one embodiment, the cartridges are introduced through the lower part of said case (2) by unscrewing it.

According to one embodiment, the cartridges are entirely opaque. In this embodiment, a sensor located inside the cartridges allows the determination of the level of base product remaining.

In another embodiment, the cartridges have at least a wall region which is transparent. In one embodiment, the cartridges have their entire wall which is transparent. This embodiment allows a user to view the remaining base product level.

According to one embodiment, the delivery system (1) has an intuitive cartridge reloading system making it possible to replace only the missing base product. In one embodiment, each cartridge has a unique QR code printed on its surface and able to be read by a computer program placed inside or outside said case (2). In one embodiment, each cartridge has a unique RFID chip affixed to its surface and able to be read by a computer program placed inside or outside said case (2). In one embodiment, each cartridge has a unique NFC chip affixed to its surface and able to be read by a computer program placed inside or outside said case (2). These embodiments allow a user to know various information concerning said cartridges, such as the level of base product, the traceability or even the expiration date after opening.

In another embodiment, the cartridges are linked to one another. In this embodiment, a single QR code is present for all the cartridges. In this embodiment, a single RFID chip is present for all the cartridges. In this embodiment, a single NFC chip is present for all the cartridges.

According to one embodiment, each of the reservoirs ($\mathbf{3}_1$, $\mathbf{3}_2$, . . . ) contains a respective base product ($\mathbf{11}_1$, $\mathbf{11}_2$, . . . ). In one embodiment, the base product is a cosmetic formulation. In one embodiment, the base product is a pigmented cosmetic formulation. In one embodiment, the base product is a pigmented formulation.

According to one embodiment, the delivery system (1) further comprises an additional reservoir (3') containing a cleaning product. In this embodiment, the cleaning fluid is applied by metering on the applicator (12) in order to eliminate the residues of the dispensed mixture remaining on the applicator. In this embodiment, a waste chamber is disposed below said applicator (12).

In another embodiment, the additional reservoir (3') containing a cleaning product is under pressure. In this embodiment, the additional reservoir (3') containing a cleaning product is provided with a valve in fluid communication with the cleaning product. When the valve is actuated, the cleaning product is then projected on the application device. The applicator positions itself in front of the mixing device and the latter activates itself in order to eliminate the residues of the delivered mixture remaining on the applicator and evacuate them in a waste bin.

In another embodiment, the cleaning product is runned on the applicator (12). In this embodiment, the additional reservoir (3') containing a cleaning product is positioned inside the application device and is in fluid communication with the application device. The liquid flow is controlled by a valve. Once dosed on the application device, the applicator positions itself in front of the mixing device and the latter activates itself in order to eliminate the residues of the delivered mixture remaining on the applicator and evacuate them in a waste bin.

In another embodiment, the applicator (12) is able to move inside the additional reservoir (3') containing a cleaning product. The applicator positions itself in front of the mixing device and the latter activates itself in order to eliminate the residues of the delivered mixture remaining on the applicator and evacuate them in a waste bin.

In another embodiment, the additional reservoir (3') contains a liquid which has the particular feature of being able to depigment the residues of the delivered mixture which are then evacuated into a waste bin.

Metering Device

Figure 4:
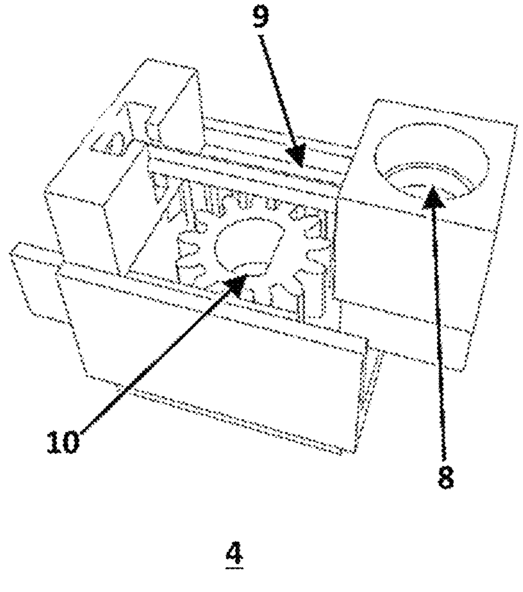
FIG. 4 represents in isolation one of the metering devices.

FIG. 4 represents in isolation one of the metering devices (4). The metering device comprises a pre-metering chamber (8) into which the reservoir head is inserted. The metering device also comprises a metering rod (9) movable between the pre-metering chamber and the application device (5). Said metering rod is in communication with a means of displacement (10) comprising a gear and rack device and able to give said rod a back and forth movement between said pre-metering chamber (8) and the application device (5). The means of displacement (10) is actuated using a first motor (14) not shown here, the motor being controlled by a control means not shown here.

Figure 5:
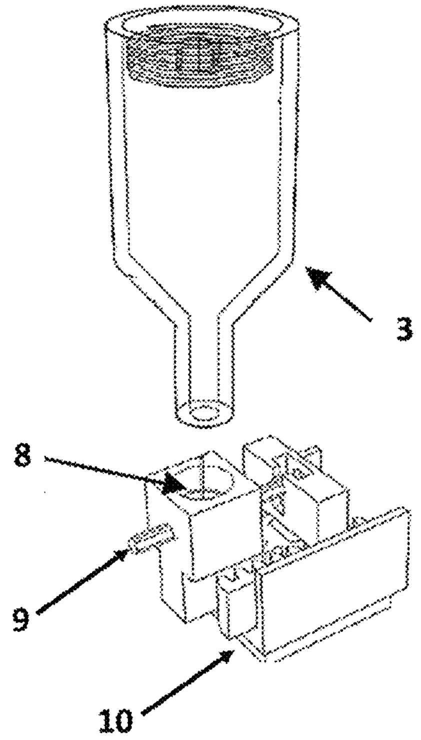
FIG. 5 represents in isolation one of the metering devices and one of the reservoirs.
Figure 6:
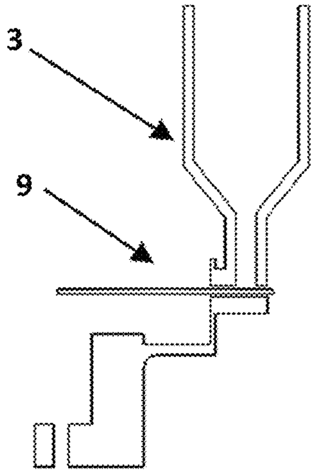
FIG. 6 represents in isolation one of the metering devices in communication with one of the reservoirs.

FIGS. 5 and 6 represent in isolation one of the metering devices in communication with a reservoir (3).

According to a preferred embodiment, the or each metering device (4) comprises:

- a pre-metering chamber (8) configured to be in fluid communication in a selective manner with one of the reservoirs ($3_1$, $3_2$, . . . , 3') of base product;
- a metering member (9) able to extract from the pre-metering chamber a predetermined quantity of a base product and movable between the pre-metering chamber and the application device;
- a means of displacement (10) of the metering member, able to give the metering member a predetermined movement between the pre-metering chamber and the application device in order to deposit on the application device a dose of base product corresponding to said determined composition.

Figure 7:
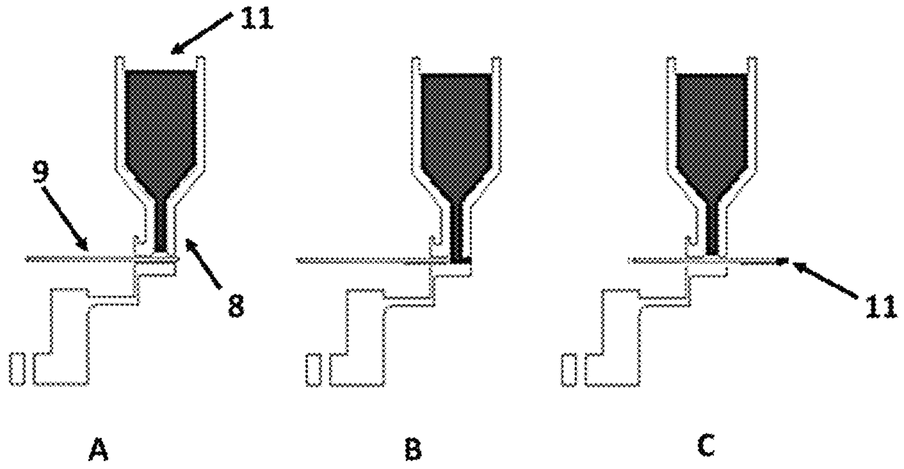
FIG. 7 represents the breakdown of the dosage steps allowing the delivery of the base product.

FIGS. 7A, B and C show the breakdown of the dosing steps allowing the delivery of the base product (11) to the application device (5) not shown here. Thus, as shown in FIG. 7A, in a first waiting phase the metering rod (9) blocks the arrival of the base product (11) in the pre-metering chamber (8). As visible in FIG. 7B, then comes the initiation phase during which the rod makes a backward movement in order to allow a predetermined quantity of base product (11) to enter the pre-metering chamber (8). FIG. 7C shows the deposit phase, during which the rod moves forward while crossing the pre-metering chamber (8) in which it recovers the predetermined quantity of base product (11) and deposits it on the application device (5) not shown here.

According to one embodiment, the metering member (9) is a metering rod. In one embodiment, the predetermined movement is a back and forth movement. In one embodiment, said metering rod (9) deposits a predetermined quantity of base product (11) each round trip. In one embodiment, said metering rod (9) is able to deposit on the application device a quantity of base product (11) between 0.07 μl and 150 ml. In one embodiment, said metering rod (9) is able to deposit on the application device a quantity of base product (11) preferably between 0.07 μl and 100 ml. In one embodiment, said metering rod (9) is able to deposit on the application device a quantity of base product (11) between 0.07 μl and 50 ml. In one embodiment, said metering rod (9) is able to deposite on the application device a quantity of base product (11) between 10 μl and 50 ml. In one embodiment, said metering rod (9) is able to deposit on the application device a quantity of base product (11) between 0.07 μl and 10 ml.

According to one embodiment, the metering devices (4) are controlled separately by a control means which makes it possible to vary the volume delivered from each reservoir ($3_1$, $3_2$, . . . , 3') and to refine the dosing of base products according to the needs.

In one embodiment, the metering device is the same for each reservoir ($3_1$, $3_2$, . . . , 3'). In this embodiment, the metering device is made up of a metering rod moving back and forth between the reservoirs ($3_1$, $3_2$, . . . , 3') and the application device (5). During dosing, the cartridges place themselves in front of the metering device which retrieves a predefined number of doses and places them on the application device.

In another embodiment, the metering device is a pump in fluid communication in a selective manner with one of the reservoirs ($3_1$, $3_2$, . . . , 3') of base product. During dosing, the pump takes a predefined dose of base product from one of the reservoirs ($3_1$, $3_2$, . . . , 3') and places it on the application device.

In one embodiment, the metering device is a peristaltic pump. In one embodiment, the metering device is a piezoelectric pump.

In another embodiment, the metering device is provided with a valve in fluid communication in a selective manner with one of the reservoirs ($3_1$, $3_2$, . . . , 3') of base product. In this embodiment, the reservoirs ($3_1$, $3_2$, . . . , 3') are under pressure and when the valve is actuated, the base product is projected on the application device (5).

In one embodiment, the metering device is a syringe. In this embodiment, the body of the syringe is one of the reservoirs ($3_1$, $3_2$, . . . , 3'). During dosing, an actuator pushes the plunger of the syringe. The base product is then deposited on the application device.

In one embodiment, the metering device is a gear wheel located in a pre-metering chamber. As it turns, the wheel picks up a dose of formula and deposits it on the application device.

In one embodiment, the metering device is a nozzle equipped with a heating resistor.

In another embodiment, the metering device is a valve able to control the opening and closing of a metering conduit. Alternatively, the valve is replaced by a plate doing round-trips.

Mixing Device

Figure 8:
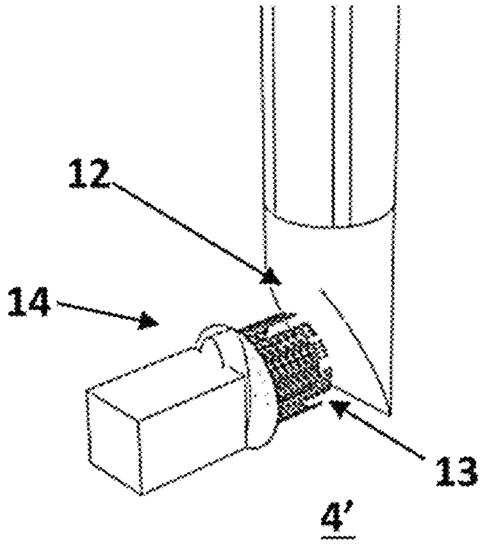
FIG. 8 represents in isolation the mixing device and a portion of the applicator.

FIG. 8 represents in isolation the mixing device (4') and a portion of the applicator (12) and the end piece of said applicator (12). The mixture is carried out using a motorized rotating brush (13) able to put itself on the applicator (12). The movements of said brush will allow the homogenization of the various predetermined quantities of base product (11) previously deposited by the metering devices (4) during the various metering steps.

According to one embodiment, the mixing device (4') comprises a motorized rotating brush (13) able to put itself on the application device (5) in order to homogenize the mixture.

According to one embodiment, the movement and the speed of the brush (13) are calculated in order to concentrate the mixture and avoid projections. In one embodiment, said rotating brush has a speed of rotation between 35 rpm and 370 rpm.

In another embodiment, the mixing device is composed of a rod able to move on the application device (5) in a circle or along a predefined path.

In another embodiment, the mixing device is a ring in which one or more strings are radially arranged. In this embodiment, the ring positions itself on the application device (5). The ring then rotates on itself around its axis. By rotating, the spokes of the ring homogenize the mixture deposited on the application device (5).

In another embodiment, the mixing device (4') is a propeller mixer. In this embodiment, the mixing device (4') consists of one or more blades rotating in one or two directions. In this embodiment, the mixture is carried out in an application chamber where the various constituents of the mixture have been dosed.

In another embodiment, the mixing device (4') is a centrifugation mixer. In this embodiment, the various constituents of the mixture are dosed in an application chamber, said application chamber then rotates at high speed on itself in order to homogenize the various constituents of the mixture.

In another embodiment, the applicator (12) is able to rotate on itself inside an application chamber where the various constituents of the mixture have been dosed.

In another embodiment, the mixing device (4') is a static mixer. In this embodiment, the metering devices are in fluid communication with one another via a static mixer. By crossing the static mixer, the formulas are homogenized.

Application Device

Figure 9:
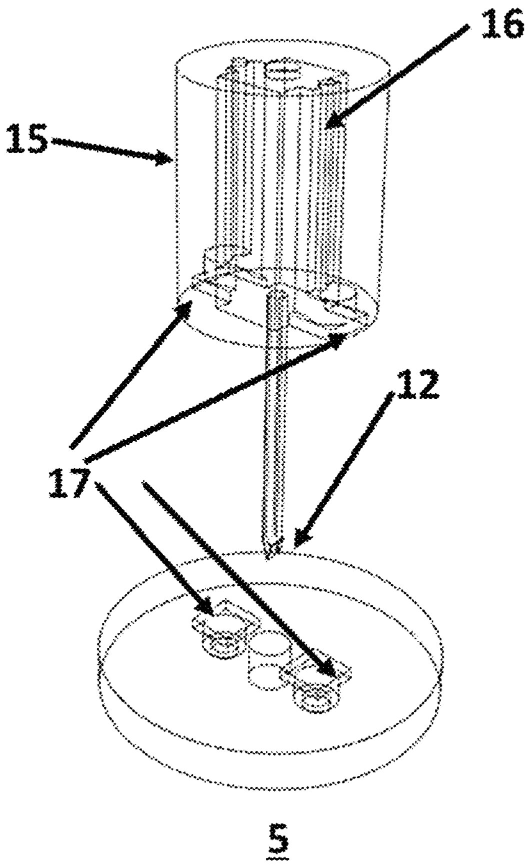
FIG. 9 represents in isolation the application device.

FIG. 9 represents in isolation the application device (5). The application device comprises an applicator (12) and a hood (15) forming a cap of the delivery device (1). The hood is provided with a motor (16) in communication with the applicator (12). The hood of the application device (5) also comprises a hanging device (17) on the case (2), which is configured to ensure a predefined positioning of the applicator (12) with respect to the metering (4) and mixing (4') devices housed in the case. More specifically, the hanging device (17) comprises two pairs of magnets positioned so as to play the role of mechanical coding. For a first pair, the south pole, on the hood, faces the north pole, on the case, whereas for the second pair, the north pole, on the hood, faces the south pole on the case, which ensures an only predefined position of the applicator. The magnetic elements located on the lower part of the hood form projections at the base of the hood. The two other magnetic elements located on the upper part of the case are housed in a hollow in order to allow the magnetic elements located on the hood to be inserted there and thus to immobilize the hood in abutment. The two pairs of magnetized elements also serve as a contact allowing current to pass from said case (2) to the application device (5).

According to one embodiment, the application device (5) comprises an applicator (12) able to receive a dose of each of the base products, a motor (16) able to move said applicator (12) in order to position it successively opposite the or each metering device (4) and opposite the mixing device (4').

According to one embodiment, the application device (5) is located on the upper part of said case (2). In one embodiment, the application device (5) is located on the lower part of said case (2). In one embodiment, the application device (5) comprises a hood (15) forming a cap of the delivery device (1), the hood (15) comprising a hanging device (17) on a case (2) housing the metering (4) and mixing (4') devices configured to ensure a predefined positioning of the applicator (12) relative to the metering (4) and mixing (4') devices.

According to one embodiment, the metering (4) and mixing (4') devices are arranged one above the other, parallel to the applicator (12), the motor (16) being able to move the applicator (12) from top to bottom along a defined longitudinal displacement in order to position it successively opposite the or each metering device (4) and opposite the mixing device (4').

According to a preferred embodiment, the metering (4) and mixing (4') devices are arranged around said applicator (12), the motor (16) being able to move the applicator (12) in rotation according to an angular displacement defined in order to position it successively opposite the or each metering device (4) and opposite the mixing device (4').

In one embodiment, the application device (5) comprises means for locking the motor (16) in a configuration separated from the hood (15) relative to the case (2) in order to block a displacement of the applicator (12).

In another embodiment, the delivery device is united to the case (2). In this embodiment, the motor (16) is able to move the applicator (12) from top to bottom according to a defined longitudinal displacement. In this embodiment, the delivery system comprises an orifice able to be crossed perpendicularly by the applicator (12).

According to one embodiment, the application device further comprises an application chamber able to receive the various base products.

According to one embodiment, the applicator (12) can take any geometrical shape depending on the needs. In one embodiment, the applicator (12) has a cylindrical shape. In one embodiment, the applicator (12) has a rectangular shape. According to a preferred embodiment, the applicator (12) has an elongated shape along a longitudinal axis and is directed towards the inside of said case (2). In one embodiment, the applicator (12) has an elongated and cylindrical shape. In one embodiment, the applicator (12) has on its end a bevel shape. In one embodiment, the applicator (12) has on its end a conical shape. In one embodiment, the applicator (12) has on its end the shape of a brush.

In a preferred embodiment, the applicator (12) has the shape of a lipstick stick.

In one embodiment, the applicator (12) has a length between 2 and 10 cm. In one embodiment, the applicator (12) has a length between 2 and 7 cm. In one embodiment, the applicator (12) has a length between 2 and 6 cm. In one embodiment, the applicator (12) has a length between 5 and 7 cm. In one embodiment, the applicator (12) has a length between 5 and 8 cm. In one embodiment, the applicator (12) has a length between 3 and 6 cm. In one embodiment, the applicator (12) has a length between 4 and 5 cm. In one embodiment, the applicator (12) has a length between 4 and 6 cm.

In one embodiment, the applicator (12) has a diameter between 0.2 and 7 cm. In one embodiment, the applicator (12) has a diameter between 0.2 and 2 cm. In one embodiment, the applicator (12) has a diameter between 0.4 and 0.6 cm. In one embodiment, the applicator (12) has a diameter between 0.5 and 1 cm. In one embodiment, the applicator (12) has a diameter between 1 and 6 cm. In one embodiment, the applicator (12) has a diameter between 1 and 7 cm. In one embodiment, the applicator (12) has a diameter between 2 and 7 cm. In one embodiment, the applicator (12) has a diameter between 2 and 4 cm. In one embodiment, the applicator (12) has a diameter between 3 and 5 cm. In one embodiment, the applicator (12) has a diameter between 4 and 6 cm.

According to one embodiment, the applicator (12) can be completely removable. In this embodiment, the applicator can be replaced by an applicator of different shape and/or size depending on the needs.

According to another embodiment, the applicator (12) may have a removable end piece. In this embodiment, the end piece can be replaced by an end piece of different shape and/or size depending on the needs.

In one embodiment, the end piece can be unscrewed. In this embodiment, the applicator has a thread on its end making it possible to screw an end piece of different shape and/or size depending on the needs.

In one embodiment, the end piece is beveled in shape. In one embodiment, the end piece is conical in shape. In one embodiment, the end piece has the shape of a brush.

Color Sensor and Calculation Module

According to one embodiment, the color sensor (6) is able to scan and process the information of a target color, chosen by a user. In this embodiment, the information on the scanned color is decomposed in the form of a ratio of red, green and blue primary colors and the white and black colors corresponding to the primary colors of the additive synthesis light. These must then be reworked to match the base colors needed to replicate the shades.

According to one embodiment, these operations are carried out by an on-board calculation module (18). In this embodiment, the calculation module (18) is configured to receive the data transmitted by the color sensor (6) concerning the target color. In this embodiment, the calculation module adapts the target color data received by the sensor to the base colors. In this embodiment, the calculation module (18) sends the orders to the control means of the metering devices, as to the necessary quantities of each base product to reproduce the colored product having the target color chosen by a user.

According to one embodiment, the delivery system (1) further comprises a computer program. In this embodiment, the computer program is a portable terminal such as a smart phone, a tablet or a personal computer. In this embodiment, the calculation module (18) is configured to receive data concerning a color chosen by a user directly via the computer program. In this embodiment, the calculation module (18) is configured to receive data about a user that can be entered via the computer program, such as the skin tone, the physical characteristics, the personality, the habits or the coordination with other make-ups.

In one embodiment, the color sensor (6) is a color scanner. In one embodiment, the color sensor (6) is a spectrophotometer. In one embodiment, the color sensor (6) is a CCD sensor.

The Case

Figure 10:
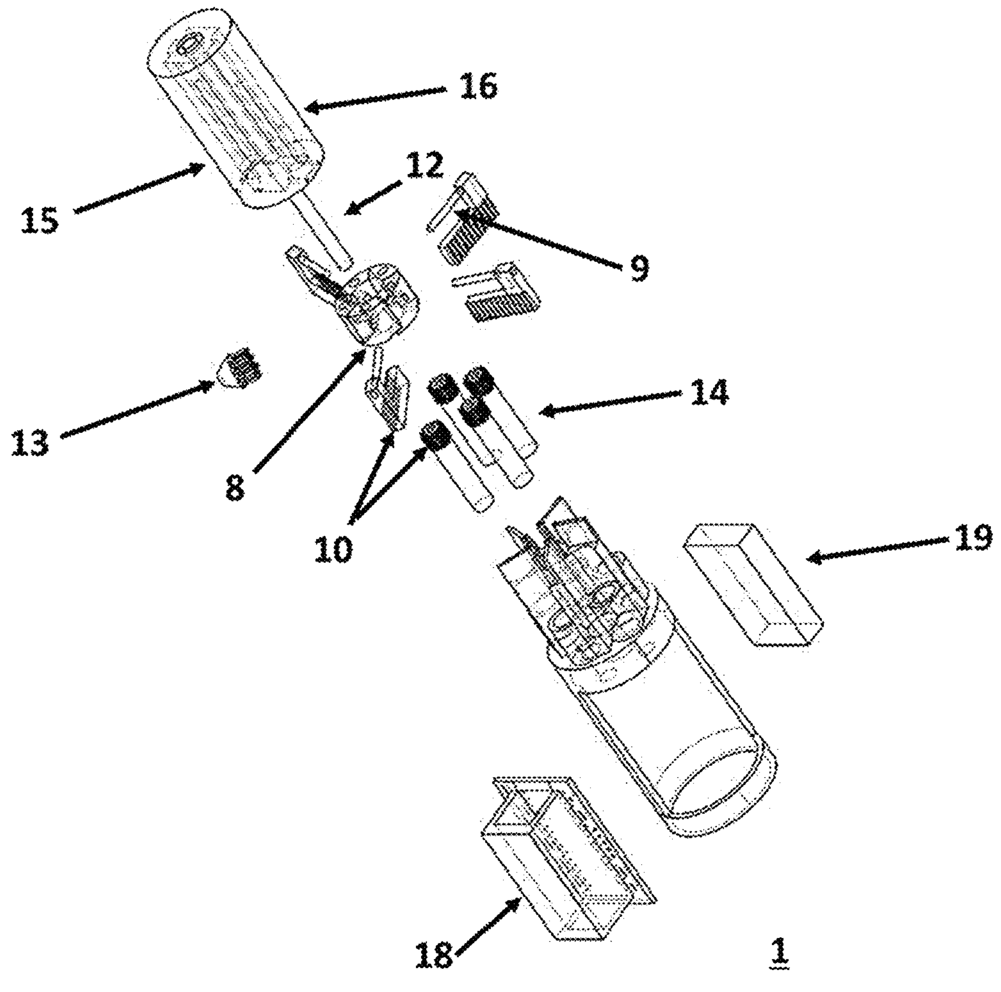
FIG. 10 is an exploded view with removal of some components of the delivery system of the present invention.

FIG. 10 shows as an exploded view the positioning of the various elements of the delivery system of the invention. In particular, FIG. 10 shows the positioning of the various constituent elements of the metering device in the upper part of the case (2). Four metering devices are shown in FIG. 10. FIG. 10 also shows the positioning of the rotating brush (13) in the upper part of the case (2). The four metering devices and the rotating brush are positioned so as to form a circle around the applicator (12). As shown in FIG. 10, the calculation module (18) and the energy supply device (19) are positioned in the lower part of the case (2).

According to one embodiment, the case (2) can take any geometrical shape depending on the needs. In one embodiment, the case (2) has a cylindrical shape. In one embodiment, the case (2) has a rectangular shape. According to a preferred embodiment, the case (2) has an elongated shape along a longitudinal axis facilitating its handling.

In one embodiment, the case (2) has a length between 5 and 20 cm. In one embodiment, the case (2) has a length between 7 and 13 cm. In one embodiment, the case (2) has a length between 10 and 20 cm.

In one embodiment, the case (2) has a width between 5 and 15 cm. In one embodiment, the case (2) has a width between 12 and 15 cm. In one embodiment, the case (2) has a width between 2 and 4 cm. In one embodiment, the case (2) has a width between 4 and 8 cm.

In one embodiment, the case (2) has a height between 3 and 20 cm. In one embodiment, the case (2) has a height between 5 and 10 cm. In one embodiment, the case (2) has a height between 10 and 20 cm.

According to one embodiment, the case (2) is able to receive at least two reservoirs ($3_1$, $3_2$, . . . ). In one embodiment, the case (2) comprises two reservoirs ($3_1$ and $3_2$). In one embodiment, the case (2) comprises three reservoirs ($3_1$ to $3_3$). In one embodiment, the case (2) comprises four reservoirs ($3_1$ to $3_4$). In one embodiment, the case (2) comprises five reservoirs ($3_1$ to $3_5$). In one embodiment, the case (2) further comprises an additional reservoir (3').

According to one embodiment, a single metering device is received in the case (2). In one embodiment, the metering device is connected to the reservoirs by distribution channels. In another embodiment, each of the reservoirs ($3_1$, $3_2$, . . . , 3') is able to move in front of the metering device.

According to a preferred embodiment, the case (2) is able to receive as many metering devices (4) as there are reservoirs ($3_1$, $3_2$, . . . , 3'). In one embodiment, the case (2) comprises two metering devices (4). In one embodiment, the case (2) comprises three metering devices (4). In one embodiment, the case (2) comprises four metering devices (4). In one embodiment, the case (2) comprises five metering devices (4). In one embodiment, the case (2) comprises six metering devices (4).

According to one embodiment, the case (2) is able to receive the mixing device (4').

According to one embodiment, the reservoirs ($3_1$, $3_2$, . . . , 3'), the metering devices (4) and the mixing device (4') are arranged so as to form a circle around said longitudinal axis.

According to one embodiment, the case (2) comprises a energy supply device (19). In this embodiment, the hanging device (17) ensures an electrical contact between the energy supply device (19) and the motor (16) for displacement of the applicator.

According to one embodiment, the case (2) is provided with a color sensor (6). In one embodiment, the color sensor (6) is located on the lower part of said case (2). In one embodiment, the color sensor (6) is located on the upper part of said case (2). In another embodiment, the color sensor (6) is located on the lateral part of said case (2).

According to one embodiment, the case (2) is provided with a screen display. In this embodiment, a user has the means to preview the mixture produced before application and to modify it if necessary, but also to obtain information on the use levels of the battery and the cartridges.

According to one embodiment, the case (2) is made of plastic material. In one embodiment, the case (2) is made of aluminum. In one embodiment, the case (2) is made of glass. According to a preferred embodiment, the case (2) is made of a renewable material. In one embodiment, the case (2) is made of plant material. In one embodiment, the case (2) is made of bamboo.

Method for Delivering a Colored Product Having a Target Color

The present invention also relates to a method of custom-made delivering of a colored product having a target color using a delivery system (1), as described above, comprising the following steps:

scanning and decomposing the target color using the color sensor (6);

receiving information about the target color using the calculation module (18);

determining a composition of the colored product from the base products contained in the reservoirs ($3_1$, $3_2$, . . . );

depositing on the application device (5), using the or each metering device (4), a dose of each of the base products corresponding to said determined composition;

mixing the doses of base products deposited on the application device (5) using the mixing device (4').

In one embodiment, the application device (5) is unlocked after mixing the doses of the base products, so as to allow a user to apply the colored product.

In one embodiment, the application device (5) is positioned in its original position after application of the colored product by a user.

In one embodiment, a cleaning product is applied on the applicator (12) in order to remove residual colored products remaining on the applicator (12).

In one embodiment, the previous steps can be repeated in order to reproduce a colored product having the same color or a different color.

Cosmetic Use

According to one embodiment, the delivery system (1) of the invention is used in cosmetic applications requiring the delivering of a colored product having a target color. In one embodiment, the delivery system (1) of the invention is used for delivering a tint of lipstick, eye shadow, foundation, concealer, blush, powder, lip liner, eye pensil, eyeliner, mascara, nail polish or hair coloring. In one embodiment, the delivery system (1) of the invention is used for delivering a lipstick tint.

Other Uses

In one embodiment, the delivery system (1) of the invention can be used for different applications requiring the delivery of a colored product having a target color. In one embodiment, the delivery system (1) of the invention is used in the art field, for example as a brush, marker, pencil, pen or pastel. In the field of building restoration, for example wax, resin, lacquer, coating and varnish. In the clothing field, for example, dye, wax. In one embodiment, the delivery system (1) of the invention is used in the food sector, for example for the distribution of food coloring. In one embodiment, the delivery system (1) of the invention is used in the automobile field, for delivering car paint. In one embodiment, the delivery system (1) of the invention is used in the medical field, for example for the delivery of custom-made reactive solutions.

Although various embodiments have been described and illustrated, the detailed description should not be construed as being limited thereto. Various modifications may be made to the embodiments by those skilled in the art without departing from the true spirit and scope of the disclosure as defined by the claims.

The invention claimed is:

1. A delivery system of a colored product having a target color, comprising:

an application device of the colored product;

at least two reservoirs each containing a respective base product;

a calculation module configured to receive the information concerning said target color and to determine a composition of the colored product from the base products contained in the reservoirs;

at least one metering device in fluid communication with the reservoirs, configured to deposit on the application device a dose of each of the base products corresponding to said determined composition; and a mixing device configured to mix the doses of the base products deposited on the application device.

2. The delivery system according to claim 1, further comprising a color sensor able to scan and decompose the target color and to communicate the information of the target color to the calculation module.

3. The delivery system according to claim 1, further comprising a computer program able to communicate the target color information to the calculation module.

4. The delivery system according to claim 1, wherein the application device comprises:

an applicator able to receive a dose of each of the base products; and a motor able to move the applicator in order to position it successively opposite the or each metering device and opposite the mixing device.

5. The delivery system according to claim 4, wherein the application device comprises a hood forming a cap of the delivery system, the hood comprising a hanging device on a case housing the or each metering device and the mixing device, the hanging device being configured to ensure a predefined positioning of the applicator relative to the metering and mixing devices.

6. The delivery system according to claim 4, wherein the metering and mixing devices are distributed around the applicator, the motor being able to move the applicator in rotation according to a defined angular displacement in order to position it successively opposite the or each metering device and opposite the mixing device.

7. The delivery system according to claim 1, further comprising an additional reservoir containing a cleaning product.

8. The delivery system according to claim 1, comprising, for each reservoir containing a base product, a respective metering device in fluid communication with said reservoir, which is configured to deposit on the application device a dose of the base product contained in said reservoir.

9. The delivery system according to claim 1, wherein the or each metering device comprises:

a pre-metering chamber configured to be in fluid communication in a selective manner with one of the reservoirs of base product;

a metering member able to extract from the pre-metering chamber a predetermined quantity of base product and movable between the pre-metering chamber and the application device;

a means of displacement of the metering member, able to give the metering member a predetermined movement between the pre-metering chamber and the application device in order to deposit on the application device a dose of the base product corresponding to said determined composition, the means of displacement comprising a gear and rack device and being able to give said metering member a back and forth movement between said pre-metering chamber and the application device.

10. The delivery system according to claim 1, wherein the reservoirs, the or each metering device and the mixing device are housed in the same case.

11. The delivery system according to claim 1, wherein each base product is a pigmented cosmetic formulation.

12. The delivery system according to claim 1, wherein the reservoirs are removable cartridges.

13. The delivery system according to claim 1, wherein the mixing device comprises a motorized rotating brush able to put itself on the application device to homogenize the mixture of the doses of base products deposited on the application device.

14. The delivery system according to claim 5, wherein the delivery system contains an energy supply device and in that the hanging device ensures electrical contact between the energy supply device and the motor for displacement of the applicator.

15. A method of custom-made delivery of a colored product having a target color using the delivery system according to claim 1, comprising the following steps:

scanning and decomposing the target color using the color sensor;

receiving the information concerning the target color using the calculation module;

determining a composition of the colored product from the base products contained in the reservoirs;

depositing on the application device, using the or each metering device, a dose of each of the base products corresponding to said determined composition; and mixing the doses of base products deposited on the application device using the mixing device.

16. A delivery system of a colored product having a target color, comprising:

an application device of the colored product, the application device comprising an outer surface, the outer surface having an application portion configured to apply the colored product on a user;

at least two reservoirs each containing a respective base product;

a calculation module configured to receive the information concerning said target color and to determine a composition of the colored product from the base products contained in the reservoirs;

at least one metering device in fluid communication with the reservoirs, configured to deposit on the application portion of the outer surface of the application device a dose of each of the base products corresponding to said determined composition; and a mixing device configured to mix the doses of the base products deposited on the application portion of the outer surface of the application device.

17. The delivery system according to claim 16, further comprising a color sensor able to scan and decompose the target color and to communicate the information of the target color to the calculation module.

18. The delivery system according to claim 16, further comprising a computer program able to communicate the target color information to the calculation module.

19. The delivery system according to claim 16, wherein the application device comprises:

an applicator able to receive a dose of each of the base products, the applicator comprising the application portion; and a motor able to move the applicator in order to position it successively opposite the or each metering device and opposite the mixing device.

20. The delivery system according to claim 19, wherein the metering and mixing devices are distributed around the applicator, the motor being able to move the applicator in rotation according to a defined angular displacement in order to position it successively opposite the or each metering device and opposite the mixing device.

21. The delivery system according to claim 19, wherein the application device comprises a hood forming a cap of the delivery system, the hood comprising a hanging device on a case housing the or each metering device and the mixing device, the hanging device being configured to ensure a predefined positioning of the applicator relative to the metering and mixing devices.

22. The delivery system according to claim 21, wherein the delivery system contains an energy supply device and in that the hanging device ensures electrical contact between the energy supply device and the motor for displacement of the applicator.

23. The delivery system according to claim 16, further comprising an additional reservoir containing a cleaning product.

24. The delivery system according to claim 16, comprising, for each reservoir containing a base product, a respective metering device in fluid communication with said reservoir, which is configured to deposit on the application portion of the outer surface of the application device a dose of the base product contained in said reservoir.

25. The delivery system according to claim 16, wherein the or each metering device comprises:

a pre-metering chamber configured to be in fluid communication in a selective manner with one of the reservoirs of base product;

a metering member able to extract from the pre-metering chamber a predetermined quantity of base product and movable between the pre-metering chamber and the application device;

a means of displacement of the metering member, able to give the metering member a predetermined movement between the pre-metering chamber and the application device in order to deposit on the application portion of the outer surface of the application device a dose of the base product corresponding to said determined composition.

26. The delivery system according to claim 16, wherein the reservoirs, the or each metering device and the mixing device are housed in the same case.

27. The delivery system according to claim 16, wherein each base product is a pigmented cosmetic formulation.

28. The delivery system according to claim 16, wherein the reservoirs are removable cartridges.

29. The delivery system according to claim 16, wherein the mixing device comprises a motorized rotating brush able to put itself on the application portion of the outer surface of the application device to homogenize the mixture of the doses of base products deposited on the application portion of the outer surface of the application device.

30. A method of custom-made delivery of a colored product having a target color using the delivery system according to claim 16, comprising the following steps:

scanning and decomposing the target color using the color sensor;

receiving the information concerning the target color using the calculation module;

determining a composition of the colored product from the base products contained in the reservoirs;

depositing on the application portion of the outer surface of the application device, using the or each metering device, a dose of each of the base products corresponding to said determined composition; and mixing the doses of base products deposited on the application portion using the mixing device.

* * * * *